United States Patent
Miyauchi et al.

(10) Patent No.: US 10,017,666 B2
(45) Date of Patent: Jul. 10, 2018

(54) POLYIMIDE RESIN COMPOSITION AND VARNISH PRODUCED FROM TERMINAL-MODIFIED IMIDE OLIGOMER PREPARED USING 2-PHENYL-4,4'-DIAMINODIPHENYL ETHER AND THERMOPLASTIC AROMATIC POLYIMIDE PREPARED USING OXYDIPHTHALIC ACID, POLYIMIDE RESIN COMPOSITION MOLDED ARTICLE AND PREPREG HAVING EXCELLENT HEAT RESISTANCE AND MECHANICAL CHARACTERISTIC, AND FIBER-REINFORCED COMPOSITE MATERIAL THEREOF

(71) Applicants: Kaneka Corporation, Osaka (JP); Japan Aerospace Exploration Agency, Tokyo (JP)

(72) Inventors: Masahiko Miyauchi, Osaka (JP); Yuichi Ishida, Tokyo (JP); Toshio Ogasawara, Tokyo (JP); Rikio Yokota, Kanagawa (JP)

(73) Assignees: Kaneka Corporation (JP); Japan Aerospace Exploration Agency (JP)

( * ) Notice: Subject to any disclaimer, the term of this patent is extended or adjusted under 35 U.S.C. 154(b) by 160 days.

(21) Appl. No.: 14/890,065

(22) PCT Filed: Apr. 21, 2014

(86) PCT No.: PCT/JP2014/061170
§ 371 (c)(1),
(2) Date: Nov. 9, 2015

(87) PCT Pub. No.: WO2014/181670
PCT Pub. Date: Nov. 13, 2014

(65) Prior Publication Data
US 2016/0083618 A1 Mar. 24, 2016

(30) Foreign Application Priority Data
May 10, 2013 (JP) .................. 2013-100525

(51) Int. Cl.
*C08L 79/08* (2006.01)
*C09D 179/08* (2006.01)
(Continued)

(52) U.S. Cl.
CPC ............ *C09D 179/08* (2013.01); *B29C 39/02* (2013.01); *B29C 39/38* (2013.01); *B32B 5/26* (2013.01); *B32B 37/1207* (2013.01); *B32B 38/004* (2013.01); *C08G 73/1042* (2013.01); *C08G 73/1046* (2013.01); *C08G 73/1053* (2013.01); *C08G 73/1071* (2013.01); *C08J 5/18* (2013.01); *C08J 5/24* (2013.01); *C08L 79/08* (2013.01); *B29K 2079/08* (2013.01); *B29L 2007/008* (2013.01); *B32B 2037/1223* (2013.01); *B32B 2037/1238* (2013.01); *B32B 2260/023* (2013.01); *B32B 2260/046* (2013.01); *B32B 2262/105* (2013.01); *B32B 2307/306* (2013.01); *B32B 2307/51* (2013.01); *B32B 2307/54* (2013.01); *B32B 2313/04* (2013.01); *B32B 2379/08* (2013.01); *B32B 2605/18* (2013.01);
(Continued)

(58) Field of Classification Search
None
See application file for complete search history.

(56) References Cited

U.S. PATENT DOCUMENTS 4,920,005 A * 4/1990 Mercer ............... C08G 61/127
428/411.1
6,281,323 B1 8/2001 Yokota et al.
(Continued)

FOREIGN PATENT DOCUMENTS

JP H03111450 A 5/1991
JP 2000219741 A 8/2000
(Continued)

OTHER PUBLICATIONS

M. Miyauchi et al, Synthesis and characterization of soluble phenylethynyl-terminated imide oligomers derived from pyromellitic dianhydride and 2-phenyl-4,4'-diaminodiphenyl ether, Reactive and Functional Polymers, 2013, 73, 340-345.*
(Continued)

*Primary Examiner* — Ana L Woodward
(74) *Attorney, Agent, or Firm* — Lerner, David, Littenberg, Krumholz & Mentlik, LLP

(57) ABSTRACT

An imide resin composition including a terminal-modified imide oligomer of General Formula (1) and a thermoplastic aromatic polyimide of General Formula (2). (In Formula (1), either $R_1$ or $R_2$ shows a phenyl group and the other shows a hydrogen atom; $R_3$ and $R_4$ show a divalent residue of aromatic diamine; $R_5$ and $R_6$ show a tetravalent residue of aromatic tetracarboxylic acid; m and n satisfy relationships of $m \geq 1$, $n \geq 0$, $1 \leq m+n \leq 20$, and $0.05 \leq m/(m+n) \leq 1$; and an arrangement of repeating units may be either a block or random.) (In Formula (2), $R_1$ and $R_2$ show a divalent residue of aromatic diamine; $R_3$ shows a tetravalent residue of aromatic tetracarboxylic acid; m and n satisfy relationships of $m \geq 1$ and $n \geq 0$, and an arrangement of repeating units may be either a block or random).

13 Claims, No Drawings

(51) Int. Cl.
*C08J 5/18* (2006.01)
*C08J 5/24* (2006.01)
*C08G 73/10* (2006.01)
*B32B 5/26* (2006.01)
*B29C 39/02* (2006.01)
*B29C 39/38* (2006.01)
*B32B 37/12* (2006.01)
*B32B 38/00* (2006.01)
*B29K 79/00* (2006.01)
*B29L 7/00* (2006.01)

(52) U.S. Cl.
CPC ..... *C08J 2379/08* (2013.01); *C08L 2205/025* (2013.01)

(56) References Cited

U.S. PATENT DOCUMENTS

2011/0165809 A1 7/2011 Miyauchi et al.
2014/0011950 A1 1/2014 Miyauchi et al.

FOREIGN PATENT DOCUMENTS

| JP | 2003526704 A | 9/2003 |
| JP | 2006312699 A | 11/2006 |
| WO | 2010027020 A1 | 3/2010 |
| WO | 2012128165 A1 | 9/2012 |

OTHER PUBLICATIONS

International Search Report for Application No. PCT/JP2014/061170 dated Jul. 24, 2014.
P.M. Hergenrother and J. G. Smith Jr., Polymer, 35, 4857 (1994).
R. Yokota, S. Yamamoto, S. Yano, T. Sawaguchi, M. Hasegawa, H. Yamaguchi, H. Ozawa and R. Sato, High Perform. Polym., 13, 861 (2001).

* cited by examiner

POLYIMIDE RESIN COMPOSITION AND VARNISH PRODUCED FROM TERMINAL-MODIFIED IMIDE OLIGOMER PREPARED USING 2-PHENYL-4,4'-DIAMINODIPHENYL ETHER AND THERMOPLASTIC AROMATIC POLYIMIDE PREPARED USING OXYDIPHTHALIC ACID, POLYIMIDE RESIN COMPOSITION MOLDED ARTICLE AND PREPREG HAVING EXCELLENT HEAT RESISTANCE AND MECHANICAL CHARACTERISTIC, AND FIBER-REINFORCED COMPOSITE MATERIAL THEREOF

CROSS-REFERENCE TO RELATED APPLICATION

The present application is a national phase entry under 35 U.S.C. § 371 of International Application No. PCT/JP2014/061170, filed Apr. 21, 2014, which claims priority from Japanese Application No. 2013-100525, filed May 10, 2013, all of which are incorporated herein by reference.

TECHNICAL FIELD

The present invention relates to a polyimide powder, varnish, a film, a molded article, a prepreg, and a fiber-reinforced composite material thereof, which have excellent heat resistance; and particularly to a material usable in a wide range of fields including aircraft and apparatuses for the aerospace industry, which require easy moldability and high heat resistance.

BACKGROUND ART

Aromatic polyimides have the highest level of heat resistance among polymers, also have excellent mechanical characteristics, electric characteristic, and other characteristics, and thus they are used as a material in a wide range of fields.

On the other hand, the aromatic polyimide has generally poor processability, and thus is unsuitable particularly for melt molding or as the matrix resin of fiber-reinforced composite materials. For that reason, imide oligomers whose terminals are modified with a thermal cross-linking group have been proposed. Among them, an imide oligomer whose terminals are modified with 4-(2-phenylethynyl)phthalic anhydride is well balanced in moldability, heat resistance, and physical characteristics, and is disclosed, for example, in Patent Document 1, Patent Document 2, Patent Document 3, Patent Document 4, Non-Patent Document 1, and Non-Patent Document 2.

Patent Document 1 discloses a terminal-modified imide oligomer having a logarithmic viscosity of 0.05 to 1, which is obtained by reaction of 2,3,3',4'-biphenyltetracarboxylic dianhydride having a bend, non-planar structure, an aromatic diamine, and 4-(2-phenylethynyl)phthalic anhydride; and a cured product thereof. Patent Document 1 also describes that the invention can provide a highly practical novel terminal-modified imide oligomer, and a novel cured product of the terminal-modified polyimide having high heat resistance and good mechanical characteristics such as elastic modulus, tensile strength, and elongation, as the advantageous effects.

Patent Document 2 discloses a terminal-modified imide oligomer having a low melt viscosity and moldable in resin transfer molding or resin injection molding, which is obtained, for example, by reaction of (a) a diamine bonded product obtained by bonding 50% by mole or more of a soft diamine such as 1,3-bis(3-aminophenoxy)benzene or 1,3-bis(4-aminophenoxy)benzene to a hard diamine such as 1,3-diaminobenzene, 9,9'-bis(4-aminophenyl)fluorene, or 3,4'-diaminodiphenyl ether, (b) an aromatic tetracarboxylic dianhydride such as 3,3',4,4'-biphenyl tetracarboxylic dianhydride, 4,4'-oxydiphthalic anhydride, pyromellitic dianhydride, or 4,4'-biphenoxydiphthalic anhydride, and (c) an end-capping agent such as 4-phenylethynyl phthalic anhydride.

Patent Document 3 discloses a terminal-modified imide oligomer represented by following General Formula:

[C. 1]

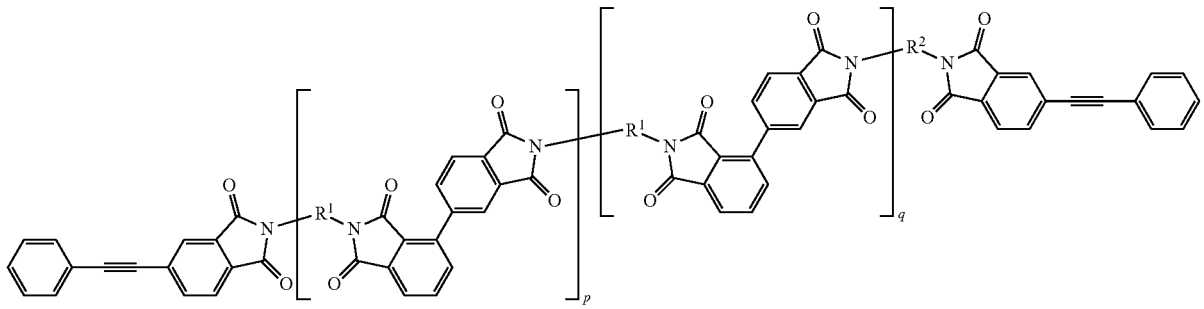

(wherein $R^1$, $R^2$, and $R^3$ show an aromatic diamine residue, $R^1$ is a divalent aromatic diamine residue derived from 9,9-bis(4-(4-aminophenoxy)phenyl)fluorene, p and q are $q \geq 0$ when $R^3 = R^1$ and $q \geq 1$ when $R^3 = R^2$, and they satisfy the relationships of $p \geq 0$, $1 \leq p+q \leq 20$, and $0 \leq q/(p+q) \leq 1$; and an arrangement of repeating units may be either a block or random.)

The present inventors have already found that an aromatic imide oligomer, which is synthesized from an aromatic diamine including 2-phenyl-4,4'-diaminodiphenyl ether and a starting material compound including 1,2,4,5-benzene tetracarboxylic acid, and is modified terminals of the resulting product with 4-(2-phenylethynyl)phthalic anhydride, shows excellent solvent solubility, melt flowability at a high temperature, and moldability, and a thermally cured product thereof exhibits excellent heat resistance and sufficient mechanical characteristics; and have disclosed in Patent Document 4.

CITATION LIST

Patent Literatures

Patent Document 1: JP-A No. 2000-219741
Patent Document 2: JP-T No. 2003-526704
Patent Document 3: JP-A No. 2006-312699
Patent Document 4: International Publication WO 2010/027020

Non-Patent Literatures

Non-Patent Document 1: P. M. Hergenrother and J. G. Smith Jr., Polymer, 35, 4857 (1994)
Non-Patent Document 2: R. Yokota, S. Yamamoto, S. Yano, T. Sawaguchi, M. Hasegawa, H. Yamaguchi, H. Ozawa and R. Sato, High Perform. Polym., 13, S61 (2001)

SUMMARY OF INVENTION

Technical Problem

The terminal-modified imide oligomer before thermal curing has a low molecular weight, and thus the oligomer is usually obtained in the state of a powder due to a few entanglements between molecular chains and it is difficult to obtain it in the shape of a self-supporting soft film. In addition, when the oligomer is melted by heating and then cooled it, a very brittle imide resin is obtained.

For producing a carbon fiber composite material form a base material including a cured product of the terminal-modified imide oligomer, a method is generally known in which a carbon fibers are infiltrated with an imide oligomer solution in which the terminal-modified imide oligomer is dissolved at a high concentration to produce a semi-dried imide wet prepreg including a part of a solvent as an intermediate, and multiple prepregs are stacked and then subjected to thermal curing. The preparation of the imide wet prepreg is for the purpose of uniformly attaching the imide oligomer solution to the surface of carbon fibers. It is known that when the prepreg has only a very small amount of the solvent or the solvent is completely removed, a terminal-modified imide oligomer powder, precipitated from the surface of the carbon fibers, is easily separated and falls from the prepreg during storage, handling, or molding of the prepreg, and it is difficult to appropriately adjust an amount of a resin included in a fiber-reinforced composite material, which will be subsequently produced.

It is also known that in a case of production of a carbon fiber composite material in which 30 or more imide wet prepregs are stacked, it is usually difficult to completely remove the solvent in the prepreg during the thermal curing and molding, using an autoclave or the like, and thus the heat resistance and the mechanical characteristics of the carbon fiber composite material may be easily reduced.

In order to solve the problems described above, a dry prepreg using a thermoplastic aromatic polyimide or a semi-aromatic polyimide has been developed. In such a dry prepreg, a soft molecular structure such as an ether bond or an unsaturated bond is applied to the inside of the molecule, in order to secure the melt flowability at a high temperature during the molding of the carbon fiber composite material. As a result, it is known that the resulting carbon fiber composite material shows a middle level heat resistance such as 250° C. or lower and has a low oxidation resistance in a practical use at a high temperature, and it is easy to cause a decomposition or an oxidative cross-linking reaction at a high temperature to cause brittling due to a low dissociation energy of a linear combination.

On the other hand, for example, in order to improve mechanical characteristics of the cured product of a thermosetting polyimide, productions of an imide resin composition to which an aromatic polyimide is added have been attempted. In almost all of them, however, the components are dry-blended, because both of or either of the thermosetting polyimide and the aromatic polyimide are/is insoluble in a solvent. As a result, it is known that the both components are not uniformly mixed in the imide resin composition, or either of them forms a phase structure, and thus it is difficult to improve the heat resistance or the mechanical characteristics.

In order to solve the problems, it has been attempted that the both components are mixed in the state of a precursor, i.e., a polyamide acid, which is soluble in a solvent, in a solvent and then are heat-treated to produce a uniformized imide resin composition. According to the method, however, it is known that an amide acid exchange reaction easily occurs between them, and thus the moldability is reduced due to heat-melting, or it is difficult to control physical properties.

In general, the fiber-reinforced composite material is integrated with a secondary material (honeycomb-shaped metal material, a spongy core, or the like) through an adhesive, depending on the practical use. A method is generally known, as an integration molding, in which a surface of the carbon fiber composite material or a secondary material is previously coated with or placed on a pasty or film-shaped adhesive, or a prepreg-shaped adhesive, in which a fiber is infiltrated with the adhesive, to obtain a laminate, and the laminate is heated. It is required for the adhesive adhering the both components to have excellent thermoplasticity in the integration molding described above, high toughness after the adhesion, and heat resistance at a high temperature, anti-oxidation stability, and the like at the time when a composite material structure is practically used at a high temperature, but there have hitherto been no reports of a heat-resistant adhesive having both of the shape and physical properties described above.

The object of the present invention is to provide a imide resin composition and varnish, including a terminal-modified imide oligomer and a thermoplastic aromatic polyimide, and an imide resin composition molded article, an imide prepreg, and a fiber-reinforced composite material prepared therefrom, having high thermal characteristics such as heat resistance, elastic modulus, tensile strength, and elongation, and high mechanical characteristics.

Solution to Problem

As a result of the present inventors' intensive studies in order to solve the problems, they have found an imide resin composition answering the object, and have completed the present invention.

The present invention provides a polyimide resin composition including a terminal-modified imide oligomer represented by General Formula (1) described below; and a thermoplastic aromatic polyimide having oxybisphthalimide skeleton derived form an oxydiphthalic acid, represented by General Formula (2) described below (hereinafter referred to as "imide resin composition").

[C. 2]

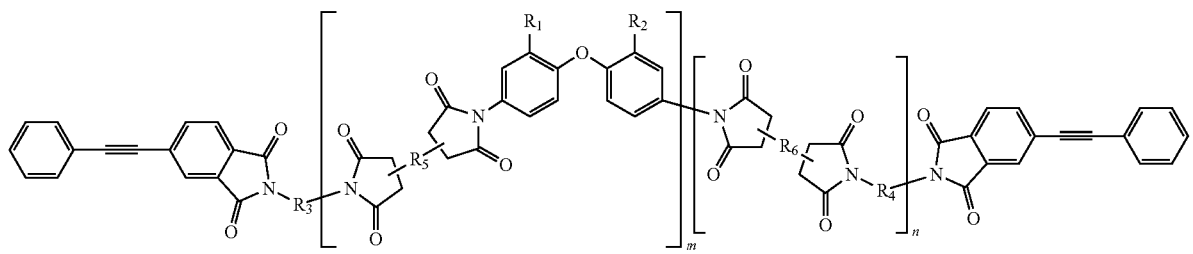

(1)

(In Formula (1), $R_1$ and $R_2$ show a hydrogen atom or a phenyl group, and either of them is the phenyl group: $R_3$ and $R_4$ are the same or different, and each shows a divalent aromatic diamine residue; $R_5$ and $R_6$ are the same or different, and each shows a tetravalent aromatic tetracarboxylic acid residue; m and n satisfy relationships of $m \geq 1$, $n \geq 0$, $1 \leq m+n \leq 20$, and $0.05 \leq m/(m+n) \leq 1$; and an arrangement of repeating units may be either a block or random.)

The aromatic organic group is preferably an organic group having 4 to 40 carbon atoms, more preferably, an organic group having 4 to 30 carbon atoms, and even more preferably, an organic group having 4 to 20 carbon atoms.

An aromatic tetracarboxylic acid, forming the tetravalent aromatic tetracarboxylic acid residue represented by $R_5$ or

[C. 3]

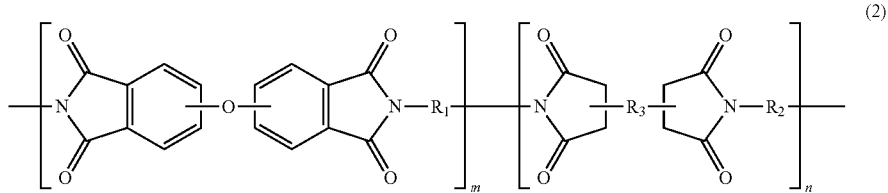

(2)

(In Formula (2), $R_1$ and $R_2$ are the same or different, and each shows a divalent aromatic diamine residue; $R_3$ shows a tetravalent aromatic tetracarboxylic acid residue; m and n satisfy relationships of $m \geq 1$ and $n \geq 0$, and an arrangement of repeating units may be either a block or random.)

In General Formula (1) and General Formula (2) described above, the aromatic diamine residue refers to a divalent aromatic organic group in which two amino groups are removed from an aromatic diamine. The aromatic tetracarboxylic acid residue refers to tetravalent aromatic organic group in which four carboxyl groups are removed from an aromatic tetracarboxylic acid. Here, the aromatic organic group is an organic group having an aromatic ring.

$R_6$ in General Formula (1) described above, is preferably 1,2,4,5-benzene tetracarboxylic acids, 3,3',4,4'-biphenyl tetracarboxylic acids, and bis(3,4-carboxyphenyl)ether, more preferably, among them, 1,2,4,5-benzene tetracarboxylic dianhydrides and 3,3',4,4'-biphenyl tetracarboxylic dianhydrides.

In the imide resin composition of the present invention, it is preferable that the tetravalent aromatic tetracarboxylic acid residue, represented by $R_5$ or $R_6$, is a tetravalent residue of 1,2,4,5-benzene tetracarboxylic acid, and the terminal-modified imide oligomer is a compound represented by General Formula (3) described below.

[C. 4]

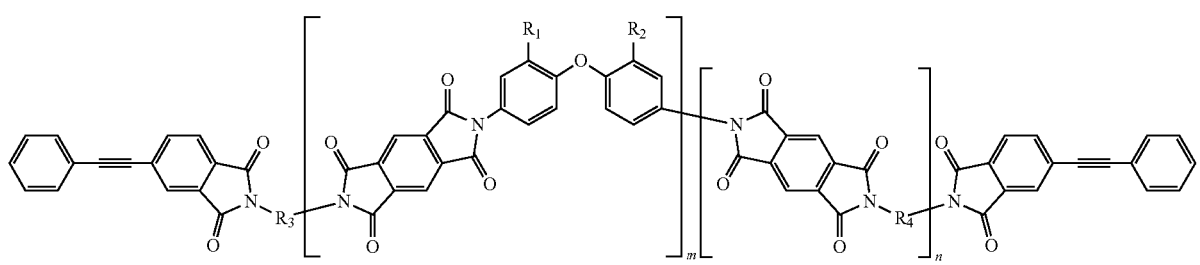

(3)

(In Formula (3), $R_1$ and $R_2$ are a hydrogen atom or a phenyl group, and either of them shows the phenyl group; $R_3$ and $R_4$ are the same or different, and each shows a divalent aromatic diamine residue; m and n satisfy relationships of $m \geq 1$, $n \geq 0$, $1 \leq m+n \leq 20$, and $0.05 \leq m/(m+n) \leq 1$, and an arrangement of repeating units may be either a block or random.)

In the imide resin composition of the present invention, it is preferable that the tetravalent aromatic tetracarboxylic acid residue, represented by $R_5$ or $R_6$, is a tetravalent residue of 3,3',4,4'-biphenyl tetracarboxylic acid, and the terminal-modified imide oligomer is a compound represented by General Formula (4) described below.

[C. 5]

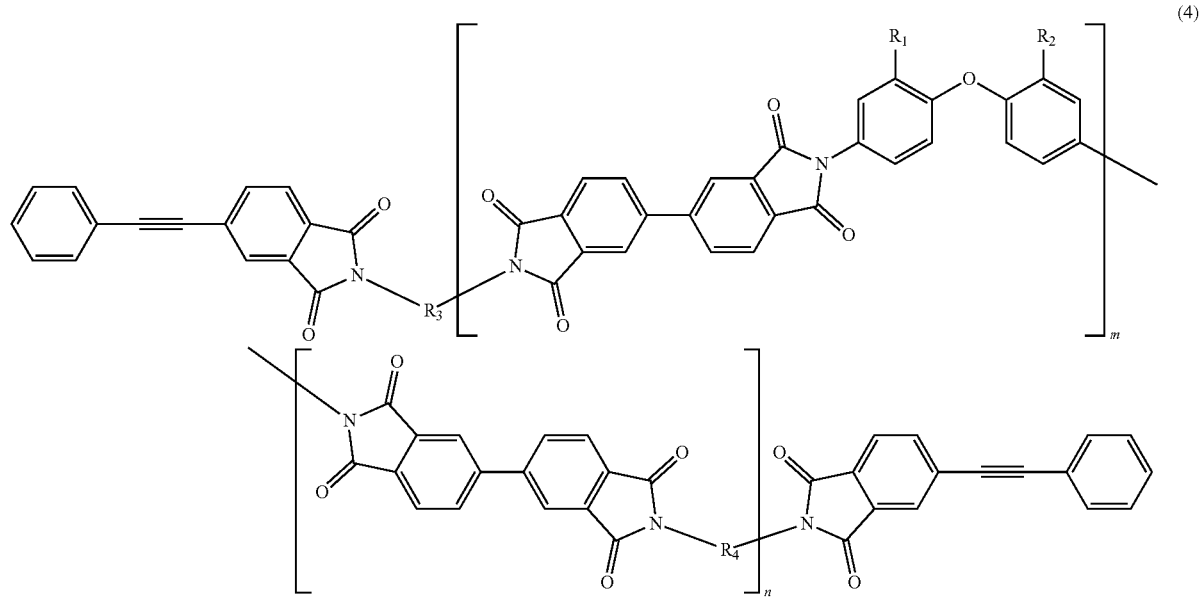

(4)

(In Formula (4), $R_1$ and $R_2$ are a hydrogen atom or a phenyl group, and either of them shows the phenyl group; $R_3$ and $R_4$ are the same or different, and each shows a divalent aromatic diamine residue; m and n satisfy relationships of $m \geq 1$, $n \geq 0$, $1 \leq m+n \leq 20$, and $0.05 \leq m/(m+n) \leq 1$, and an arrangement of repeating units may be either a block or random.)

In the imide resin composition of the present invention, it is preferable that the terminal-modified imide oligomer is a compound represented by General Formula (1) in which a part of m groups $R_5$ and n groups $R_6$ show a tetravalent residue of 1,2,4,5-benzene tetracarboxylic acid, and the rest thereof show a tetravalent residue of 3,3',4,4'-biphenyl tetracarboxylic acid.

It is preferable that the terminal-modified imide oligomer is soluble in a solvent used during synthesis thereof, such as N-methyl-2-pyrrolidone, in a solid concentration of 10% by weight or more at room temperature, in order to more easily synthesize it in a solution.

The present invention also provides a varnish obtained by dissolving the imide resin composition described above in an organic solvent. In the varnish, it is more preferable that the imide resin composition is almost completely and almost uniformly dissolved in the organic solvent.

In addition, the present invention provides a polyimide resin composition molded article obtained by thermally curing the varnish (hereinafter referred to as an "imide resin composition molded article"). The present invention also provides an imide resin composition molded article obtained by heating the imide resin composition molded article obtained above, thereby making a molecular weight of the terminal-modified imide oligomer component larger.

Further, the present invention provides a powdery imide resin composition obtained by removing an organic solvent from the varnish. The present invention also provides an imide resin composition molded article obtained by heating the powdery imide resin composition in a melted state, thereby making a molecular weight of the terminal-modified imide oligomer component larger.

Further, the present invention provides a film-shaped imide resin composition molded article obtained by coating a support with the varnish described above, and removing an organic solvent from the varnish. The present invention also provides an imide resin composition molded article obtained by heating the film-shaped imide resin composition molded article in a melted state, thereby making a molecular weight of the terminal-modified imide oligomer component larger.

The imide resin composition molded articles described above are preferably colored and transparent. The imide resin composition molded articles have desirably a glass transition temperature (Tg) of 250° C. or higher, more desirably, 270° C. or higher, and have desirably a tensile elongation at break of 10% or more.

Further, the present invention provides an imide prepreg obtained by infiltrating a fiber with the varnish and drying it. The present invention provides both of an imide wet prepreg including a solvent and an imide dry prepreg from which a solvent is almost completely removed.

Further, the present invention provides a fiber-reinforced composite material structure obtained by putting the film-shaped imide resin composition molded articles or the imide prepreg between fiber-reinforced composite materials or between a fiber-reinforced composite material and a different material, and integrating them by thermal curing.

Further, the present invention provides a fiber-reinforced composite material obtained by stacking multiple imide prepregs and thermally curing them. The fiber-reinforced composite material has desirably a Tg of 250° C. or higher, more desirably, 270° C. or higher.

DESCRIPTION OF EMBODIMENTS

The imide resin composition of the present invention includes a terminal-modified imide oligomer having a 2-phenyl-4,4'-diaminodiphenyl ether skeleton, represented by General Formula (1) described below, and a thermoplastic aromatic polyimide having an oxybisphthalimide skeleton, represented by General Formula (2) described below.

[C. 6]

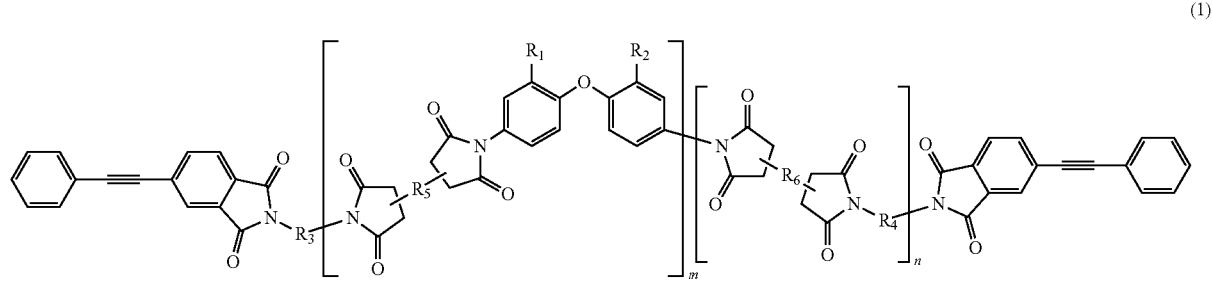

(1)

Advantageous Effects of Invention

The present invention can provide an imide resin composition and varnish, which include a terminal-modified imide oligomer and a thermoplastic aromatic polyimide, and a film-shaped imide resin composition, produced therefrom, having excellent thermal and mechanical characteristics such as heat resistance, elastic modulus, tensile strength, and elongation. In addition, when they are heated, a molecular weight of the terminal-modified imide oligomer component can be made larger, and an imide resin composition having more excellent thermal and mechanical characteristics can (In Formula (1), $R_1$ and $R_2$ show a hydrogen atom or a phenyl group, and either of them is the phenyl group; $R_3$ and $R_4$ are the same or different, and each shows a divalent aromatic diamine residue; $R_5$ and $R_6$ are the same or different, and each shows a tetravalent aromatic tetracarboxylic acid residue; m and n satisfy relationships of $m \geq 1$, $n \geq 0$, $1 \leq m+n \leq 20$, and $0.05 \leq m/(m+n) \leq 1$; and an arrangement of repeating units may be either a block or random.)

In General Formula (1) described above, when m+n is less than 1, the toughness of the cured resin may be remarkably reduced, and when m+n is more than 20, there is a likelihood of reduction of the solubility in a solvent or no exhibition of the excellent melt flowability at a high temperature. When m/(m+n) is less than 0.05, there is also likelihood of reduction of the solubility in a solvent or no exhibition of the excellent melt flowability at a high temperature.

[C. 7]

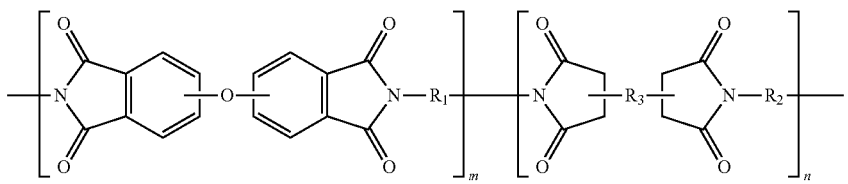

(2)

be provided. When a fiber is infiltrated with the imide-mixed resin composition and the resulting product is dried, an imide prepreg having excellent adherence with the reinforcing fiber, and easy handleability during storage or molding can be provided. When the imide prepregs are stacked and heated, a fiber-reinforced composite material having excellent thermal and mechanical characteristics such as heat resistance and toughness, and excellent reliability can be provided. When the film-shaped imide resin composition or the imide prepreg is inserted between the fiber-reinforced composite materials or between the fiber-reinforced composite material and a different material, when the materials are bonded to each other, a structure of the fiber-reinforced composite material having excellent adhesiveness can be obtained.

(In Formula (2), $R_1$ and $R_2$ are the same or different, and each shows a divalent aromatic diamine residue; $R_3$ shows a tetravalent aromatic tetracarboxylic acid residue; m and n satisfy relationships of $m \geq 1$ and $n \geq 0$, and an arrangement of repeating units may be either a block or random.)

In General Formula (2) described above, when m is less than 1, there is a likelihood of reduction of the solubility in a solvent or no exhibition of the excellent melt flowability at a high temperature.

Among the terminal-modified imide oligomers, terminal-modified imide oligomers (A) wherein the tetravalent aromatic tetracarboxylic acid residue, represented by $R_5$ or $R_6$, includes at least one residue selected from the group consisting of tetravalent residues of 1,2,4,5-benzene tetracarboxylic acid, tetravalent residues of 3,3',4,4'-biphenyl tetracarboxylic acid, and tetravalent residues of bis(3,4- carboxyphenyl)ether are preferable, because they can exhibit the high glass transition temperature (Tg), the long-term thermal stability, and the anti-oxidation stability at a high temperature.

Further, among terminal-modified imide oligomers (A), more preferred are terminal-modified imide oligomers in which the tetravalent aromatic tetracarboxylic acid residue, The terminal-modified imide oligomer in which $R_5$ and $R_6$ are the tetravalent residue of 1,2,4,5-benzene tetracarboxylic acid may include, for example, compounds represented by General Formula (3) described below. The terminal-modified imide oligomer in which $R_5$ and $R_6$ are the tetravalent residue of 3,3',4,4'-biphenyl tetracarboxylic acid may include, for example, compounds represented by General Formula (4) described below.

[C. 8]

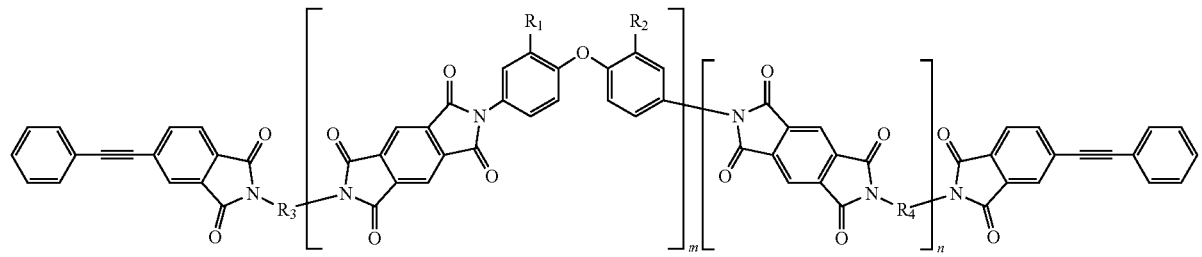

(3)

represented by $R_5$ or $R_6$, is a tetravalent residues of 1,2,4,5-benzene tetracarboxylic acid or a tetravalent residue of 3,3',4,4'-biphenyl tetracarboxylic acid; terminal-modified imide oligomers in which a part of m groups R and n groups R in General Formula (1) are/is a tetravalent residue(s) of 1,2,4,5-benzene tetracarboxylic acid, and the rest thereof are/is a tetravalent residue(s) of 3,3',4,4'-biphenyl tetracarboxylic acid; terminal-modified imide oligomers in which a part of the m groups $R_5$, and the n groups $R_6$ are/is a tetravalent residue(s) of 1,2,4,5-benzene tetracarboxylic acid, and the rest thereof are/is a tetravalent residue(s) of aromatic tetracarboxylic acid other than 1,2,4,5-benzene (In Formula (3), $R_1$, $R_2$, $R_3$, $R_4$, m, and n are same as defined in Formula (1), and an arrangement of repeating units may be either a block or random.)

Among the terminal-modified imide oligomers represented by General Formula (3), terminal-modified imide oligomers are preferable in which either of $R_1$ and $R_2$ is a hydrogen atom and the other is a phenyl group; $R_3$ is a 2-phenyl-4,4'-diaminodiphenyl ether residue or a 9,9-bis(4-aminophenyl)fluorene residue; $R_4$ is a 9,9-bis(4-aminophenyl)fluorene residue, m is 1 or more (preferably from 1 to 5), n is 0 or more (preferably from 0 to 3), 1≤m+n≤20, and 0.05≤m/(m+n)≤1.

[C. 9]

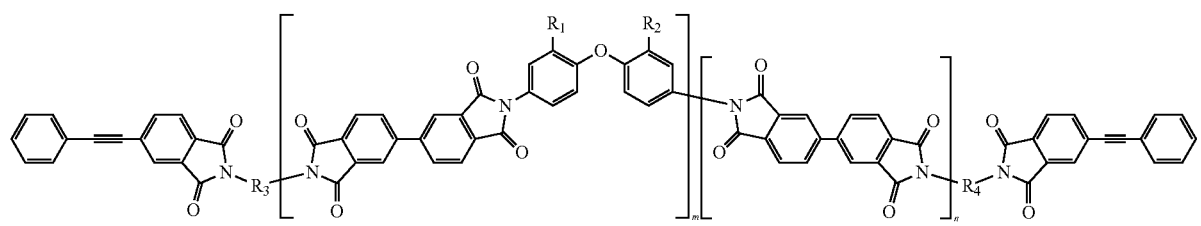

(4)

tetracarboxylic acid and 3,3',4,4'-biphenyl tetracarboxylic acid; terminal-modified imide oligomers in which a part of the m groups $R_5$ and the n groups $R_6$ are/is a tetravalent residue(s) of 3,3',4,4'-biphenyl tetracarboxylic acid, and the rest thereof are/is a tetravalent residue(s) of aromatic tetracarboxylic acid other than 1,2,4,5-benzene tetracarboxylic acid and 3,3',4,4'-biphenyl tetracarboxylic acid. Even more preferred are terminal-modified imide oligomers in which the tetravalent aromatic tetracarboxylic acid residue, represented by $R_5$ or $R_6$, is a tetravalent residue of 1,2,4,5-benzene tetracarboxylic acid, and a tetravalent residue of 3,3',4,4'-biphenyl tetracarboxylic acid.

(In Formula (4), $R_1$, $R_2$, $R_3$, $R_4$, m, and n are same as defined in Formula (1), and an arrangement of repeating units may be either a block or random.)

As describe above, the terminal-modified imide oligomer, represented by General Formula (1), has imide bonds in its main chain and unsaturated, thermal addition-polymerizable terminal groups derived from 4-(2-phenylethynyl)phthalic anhydride at the ends (preferably at both ends), and it is preferable that such an oligomer is in the state of a solid (powder) at an ordinary temperature (23° C.). It is also preferable that the terminal-modified imide oligomer represented by General Formula (1) is soluble in a solvent used in the synthesis thereof, such as N-methyl-2-pyrrolidone, in a solid concentration of 10% by weight or more at room temperature, in order to more easily synthesize it in a solution.

In the imide resin composition of the present invention, the content of the terminal-modified imide oligomer represented by General Formula (1) is not particularly limited, and the content is preferably from 10 to 90% by weight of the total amount of the composition, more preferably, from 15 to 85% by weight of the total amount of the composition, even more preferably, from 20 to 80% by weight of the total amount of the composition, and particularly preferably, from 30 to 60% by weight of the total amount of the composition. When the content of the terminal-modified imide oligomer is less than 10% by weight, there is a likelihood of no exhibition of the high glass transition temperature after heat-treatment. When the content of the terminal-modified imide oligomer is more than 90% by weight, there is a likelihood of remarkable reduction of the toughness of the film after the heat-treatment. The terminal-modified imide oligomer represented by General Formula (1) may be used alone or as a mixture of two or more kinds.

The terminal-modified imide oligomer represented by General Formula (1) can be obtained, for example, by reaction of a pre-determined aromatic tetracarboxylic acid, a pre-determined aromatic diamine, and 4-(2-phenylethynyl)phthalic anhydride (hereinafter may sometimes referred to as "PEPA") for introducing an unsaturated terminal group into the imide oligomer in pre-determined conditions described below.

Here, as the aromatic tetracarboxylic acid, one or more acids selected from 1,2,4,5-benzene tetracarboxylic acids and 3,3',4,4'-biphenyl tetracarboxylic acids are used. The 1,2,4,5-benzene tetracarboxylic acid may include 1,2,4,5-benzene tetracarboxylic acid, 1,2,4,5-benzene tetracarboxylic dianhydride (PMDA), and derivatives, such as an ester and a salt, of 1,2,4,5-benzene tetracarboxylic acid, and 1,2,4,6-benzene tetracarboxylic dianhydride is particularly preferable. The 3,3',4,4'-biphenyl tetracarboxylic acid may include derivatives, such as an ester or a salt, of 3,3',4,4'-biphenyl tetracarboxylic acid, 3,3',4,4'-biphenyl tetracarboxylic dianhydride (s-BPDA), and 3,3',4,4'-biphenyl tetracarboxylic acid, and 3,3',4,4'-biphenyl tetracarboxylic dianhydride is particularly preferable.

In the present invention, it is basic that the 1,2,4,5-benzene tetracarboxylic acid or the 3,3',4,4'-biphenyl tetracarboxylic acid is used alone or as a mixture, but a part of the 1,2,4,5-benzene tetracarboxylic acid and/or the 3,3',4,4'-biphenyl tetracarboxylic acid may be substituted by another aromatic tetracarboxylic acid, so long as the effects of the invention can be exhibited.

The other aromatic tetracarboxylic acid may include, for example, 3,3',4,4'-benzophenone tetracarboxylic dianhydride (BTDA), 2,3,3',4'-biphenyl tetracarboxylic dianhydride (a-BPDA), 2,2',3,3'-biphenyl tetracarboxylic dianhydride (i-BPDA), 2,2-bis(3,4-dicarboxyphenyl)methane dianhydride, bis(3,4-carboxyphenyl)ether dianhydride, 1,2,3,4-benzene tetracarboxylic dianhydride, and the like. The other aromatic tetracarboxylic acid may be used alone or as a mixture of two or more kinds.

As the aromatic diamine, 2-phenyl-4,4'-diaminodiphenyl ethers, more preferably, 2-phenyl-4,4'-diaminodiphenyl ether is used. As such a compound is used, the terminal-modified imide oligomer (1) has the skeleton derived from the 2-phenyl-4,4'-diaminodiphenyl ether in its molecule. In the present invention, a part of the 2-phenyl-4,4'-diaminodiphenyl ether may be substituted by another aromatic diamine.

The other aromatic diamine may include, for example, 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenyl ether (4,4'-ODA), 3,4'-diaminodiphenyl ether (3,4'-ODA), 3,3'-diaminodiphenyl ether, 3,3'-diaminobenzophenone, 4,4'-diaminobenzophenone, 3,3'-diaminodiphenyl methane, 4,4'-diaminodiphenyl methane, bis(2,6-diethyl-4-aminophenyl)methane, 4,4'-methylene-bis(2,6-diethyl aniline), bis(2-ethyl-6-methyl-4-aminophenyl)methane, 4,4'-methylene-bis(2-ethyl-6-methylaniline), 2,2-bis(3-aminophenyl)propane, 2,2-bis(4-aminophenyl)propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl]hexafluoropropane, 9,9-bis(4-aminophenyl)fluorene, 9,9-bis(4-(4-aminophenoxy)phenyl)fluorene, and the like. The other aromatic diamine may be used alone or as a mixture of two or more kinds. When as the aromatic diamine, only another aromatic diamine, for example, 4,4'-diaminodiphenyl ether, is used without using the 2-phenyl-4,4'-diaminodiphenyl ether, a terminal-modified imide oligomer soluble in N-methyl-2-pyrrolidone cannot be obtained, as shown in Comparative Example 1 described below.

In the present invention, it is preferable to use 4-(2-phenylethynyl)phthalic anhydride (hereinafter may sometimes be referred to as "PEPA") as the unsaturated acid anhydride for terminal modification (end-capping). It is preferable to use the 4-(2-phenylethynyl)phthalic anhydride in a percent within a range of 5 to 200% by mole, and particularly preferably, 5 to 150% by mole based on the total amount of the aromatic tetracarboxylic acid.

In the reaction of the pre-determined aromatic tetracarboxylic acid, the pre-determined aromatic diamine, and the 4-(2-phenylethynyl)phthalic anhydride, the components are used so that a molar amount of the acid anhydride groups of the aromatic tetracarboxylic acid and the 4-(2-phenylethynyl)phthalic anhydride is almost equal to the molar amount of the amino groups of the aromatic diamine, and the reaction is performed in the presence or absence of a solvent. Note that two (two moles) of carboxyl groups which are adjacent to each other in the aromatic tetracarboxylic acid are considered as one mole of the acid anhydride group.

More specifically, the terminal-modified imide oligomer, represented by General Formula (1), can be produced, for example, by a method described in Patent Document 4. The pre-determined aromatic tetracarboxylic acid, the pre-determined aromatic diamine, and the 4-(2-phenylethynyl) phthalic anhydride are used so that the total number of the acid anhydride groups (two moles of adjacent carboxyl groups are considered as one mole of the acid anhydride group) is almost equal to the total number of the amino groups in the all components, and the components are polymerized in a solvent at a reaction temperature of about 100° C. or lower, particularly, 80° C. or lower to produce an amide acid oligomer, which is an "oligomer having an amide-acid bond" (may sometimes be referred to as an amic acid oligomer). Then, the resulting amide acid oligomer is dehydrated and cyclized, whereby an imide oligomer having 4-(2-phenylethynyl)phthalic anhydride residue at the terminals, i.e., the terminal-modified imide oligomer, can be obtained. The dehydration and cyclization of the amide acid oligomer may include, for example, a method of addition of an imdizing agent at a temperature of about 0 to 140° C., a method in which a temperature is elevated to 140 to 275° C., and the like.

The particularly preferable production method of the terminal-modified imide oligomer represented by General Formula (1) may include, for example, a method including a synthesis step of an amide acid oligomer, a terminal modification step, and an imidization step.

In the synthesis step of an amide acid oligomer, the pre-determined aromatic tetracarboxylic acid is added to a solution in which the pre-determined aromatic diamine is uniformly dissolved in a solvent to uniformly dissolve them, and then the mixture is stirred at a reaction temperature of about 5 to 60° C. for about 1 to 180 minutes to obtain a reaction solution including an amide acid oligomer.

In the terminal modification step, 4-(2-phenylethynyl) phthalic anhydride is added to the reaction solution including the amide acid oligomer, obtained in the previous step, to uniformly dissolve them, and then the mixture is reacted at a reaction temperature of about 5 to 60° C. for about 1 to 180 minutes while the mixture is stirred to produce an amide acid oligomer having 4-(2-phenylethynyl)phthalic anhydride residues at the terminals (hereinafter referred to as a "terminal-modified amide acid oligomer").

In the imidization step, an imidization reaction of the amide acid oligomer is performed by stirring the reaction solution including the terminal-modified amide acid oligomer at 140 to 275° C. for 5 minutes to 24 hours, thereby producing a terminal-modified imide oligomer, and, if necessary, the reaction solution is cooled to about room temperature, whereby the terminal-modified imide oligomer of the present invention can be obtained.

In the reaction described above, it is preferable that all of the reaction steps or a part of the reaction steps are performed in an atmosphere of an inert gas such as nitrogen gas or argon gas, or in vacuo.

Solvent capable of dissolving starting material compounds and the terminal-modified imide oligomer are preferable as the solvent described above, and may include, for example, N-methyl-2-pyrrolidone (NMP), N,N-dimethylacetoamide (DMAc), N,N-diethylacetoamide, N-methyl caprolactam, γ-butyrolactone (GBL), cyclohexanone, and the like. The solvent may be used alone or as a mixture of two or more kinds. A known technique about a soluble polyimide can be applied to the selection of the solvent. The terminal-modified imide oligomer of the present invention may be a mixture thereof having a different molecular weight from each other.

It is preferable in terms of the synthesis that the terminal-modified imide oligomer of the present invention is soluble in the solvent described above, particularly NMP, in a solid concentration of 30% by weight or more at room temperature.

The terminal-modified imide oligomer of the present invention has little risk of occurrence of hydrolysis, and thus it can be stored in varnish or a resin alone without reduction of the viscosity, compared to an amide acid oligomer.

In the imide resin composition of the present invention, thermoplastic aromatic polyimide represented by General Formula (2), which is used together with the terminal-modified imide oligomer represented by General Formula (1), is characterized by having the oxybisphthalimide skeleton derived from an oxydiphthalic acid. Among the thermoplastic aromatic polyimides represented by General Formula (2), a thermoplastic aromatic polyimide represented by General Formula (5) described below is preferable.

[C. 10]

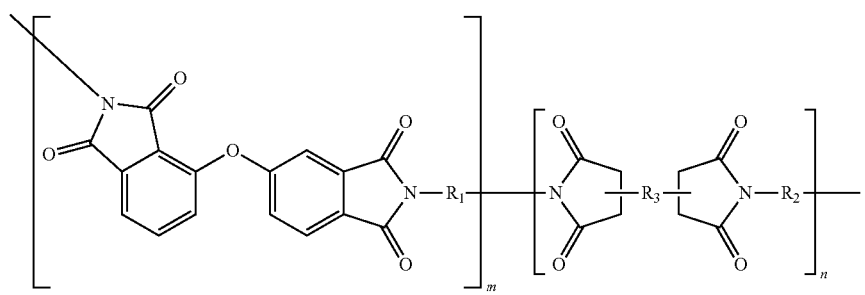

(In Formula (5), $R_1$ and $R_2$ are the same or different, and show a divalent aromatic diamine residue; $R_3$ shows a tetravalent aromatic tetracarboxylic acid residue; m and n satisfy relationships of m≥1 and n≥0, and an arrangement of repeating units may be either a block or random.)

Among the thermoplastic aromatic polyimides represented by General Formula (5), preferred are thermoplastic aromatic polyimides in which at least a part of m groups $R_1$ and n groups $R_2$ are/is at least one diaminodiphenyl ether residue selected from 4,4'-diaminodiphenyl ether (4,4'-oxydianiline)residue, 3,4'-diaminodiphenyl ether (3,4'-oxydianiline)residue, and 3,3'-diaminodiphenyl ether residue, and at least a part of n group R are/is at least one acid anhydride residue selected from 3,3'-oxydiphthalic anhydride residue, 3,4'-oxydiphthalic anhydride residue, and 4,4'-oxydiphthalic anhydride residue; and more preferred are thermoplastic aromatic polyimides in which m groups $R_1$ and n groups $R_2$ are at least one kind of the diaminodiphenyl ether residues, and n groups $R_3$ are at least one kind of the acid anhydride residues described above.

An intrinsic viscosity of the thermoplastic aromatic polyimide represented by General Formula (2) is not particularly limited, so long as the effects of the present invention can be exhibited, and it is preferably 0.2 dL/g or more, more preferably, 0.3 dL/g or more, even more preferably, 0.45 dL/g or more, and particularly preferably, 0.5 dL/g or more. The intrinsic viscosity is measured by a method described below.

A content of the thermoplastic aromatic polyimide represented by General Formula (2) in the imide resin composition of the present invention is not particularly limited, and can be selected from a wide range. It is preferably from 10 to 90% by weight of the total amount of the composition, more preferably, from 15 to 85% by weight of the total amount of the composition, even more preferably, from 20 to 80% by weight of the total amount of the composition, and particularly preferably, from 40 to 70% by weight of the total amount of the composition. When the content of the thermoplastic aromatic polyimide is less than 10% by weight, there is a likelihood of remarkable reduction of the toughness of the film after the heat-treatment. On the other hand, when the content of the thermoplastic aromatic polyimide is more than 90% by weight, the content of the terminal-modified imide oligomer is relatively reduced, and thus there is a likelihood of no expression of the high glass transition temperature after the heat-treatment. The thermoplastic aromatic polyimide may be used alone or as a mixture of two or more kinds.

The thermoplastic aromatic polyimide represented by General Formula (2) can be preferably obtained by preparing an aromatic tetracarboxylic acid including an oxydiphthalic acid (particularly preferably an acid dianhydride) and an aromatic diamine so that a total molar amount of the acid anhydride groups of the aromatic tetracarboxylic acid (two moles of adjacent carboxyl groups are considered as one mole of the acid anhydride group) is almost equal to a total molar amount of the amino groups of the aromatic diamine, and performing the reaction in the presence or absence of a solvent using polymerization and imidization method through a general polyamide acid (a thermal imidization, or a chemical imidization). The same solvent as used in the production of the terminal-modified imide oligomer can be used in this reaction.

The oxydiphthalic acid, used in the synthesis of the thermoplastic aromatic polyimide represented by General Formula (2), may include 3,3'-oxydiphthalic acid, 3,4'-oxydiphthalic acid, 4,4'-oxydiphthalic acid, 3,3'-oxydiphthalic anhydride, 3,4'-oxydiphthalic anhydride, 4,4'-oxydiphthalic anhydride, derivatives, such as an ester and a salt, of 3,3'-oxydiphthalic acid, derivatives, such as an ester and a salt, of 3,4'-oxydiphthalic acid, derivatives, such as an ester and a salt, of 4,4'-oxydiphthalic acid, and the like. Among them, the acid anhydride is preferable. The oxydiphthalic acid may be used alone or as a mixture of two or more kinds.

In the present invention, the oxydiphthalic acid may be used alone or, so long as the effects of the present invention can be exhibited, a part of the oxydiphthalic acid may be substituted by another aromatic tetracarboxylic acid. The other aromatic tetracarboxylic acid may include, for example, 3,3',4,4'-benzophenone tetracarboxylic dianhydride (BTDA), 2,3,3',4'-biphenyl tetracarboxylic dianhydride (a-BPDA), 2,2',3,3'-biphenyl tetracarboxylic dianhydride (i-BPDA), 2,2-bis(3,4-dicarboxyphenyl)methane dianhydride, bis(3,4-carboxyphenyl)ether dianhydride, 1,2,3,4-benzenetetracarboxylic dianhydride, and the like. The other aromatic tetracarboxylic acid may be used alone or as a mixture of two or more kinds.

The aromatic diamine, used in the synthesis of the thermoplastic aromatic polyimide represented by General Formula (2), is not particularly limited, and may include, for example, 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenyl ether (4,4'-oxydianiline), 3,4'-diaminodiphenyl ether (3,4'-oxydianiline), 3,3'-diaminodiphenyl ether, 3,3'-diaminobenzophenone, 4,4'-diaminobenzophenone, 3,3'-diaminodiphenyl methane, 4,4'-diaminodiphenyl methane, bis(2,6-diethyl-4-aminophenyl)methane, 4,4'-methylene-bis(2,6-diethylaniline), bis(2-ethyl-6-methyl-4-aminophenyl)methane, 4,4'-methylene-bis(2-ethyl-6-methylaniline), 2,2-bis(3-aminophenyl)propane, 2,2-bis(4-aminophenyl)propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl]hexafluoropropane, 9,9-bis(4-aminophenyl)fluorene, 9,9-bis(4-(4-aminophenoxy)phenyl) fluorene, and the like. The aromatic diamine may be used alone or as a mixture of two or more kinds.

The imide resin composition of the present invention includes the terminal-modified imide oligomer represented by General Formula (1) and the thermoplastic aromatic polyimide represented by General Formula (2) in a weight ratio of preferably 10:90 to 90:10, more preferably, 15:85 to 85:15, even more preferably, 20:80 to 80:20, and particularly preferably, 30:70 to 60:40.

The imide resin composition of the present invention can be prepared, for example, by mixing the terminal-modified imide oligomer represented by General Formula (1) with the thermoplastic aromatic polyimide represented by General Formula (2), and the resulting composition can be formed into various forms such as varnish, a powder, and a film. The imide resin composition in a varnish state of the present invention is colored transparent liquid. The powdery imide resin composition of the present invention is a colored powder. The film-shaped imide resin composition of the present invention is colored and transparent, and has the sufficient self-supporting property and a good softness.

The imide resin composition in the varnish of the present invention can be obtained, for example, by adding the film-shaped or powdery thermoplastic aromatic polyimide to the reaction solution including the terminal-modified imide oligomer after the synthesis described above in any ratio so long as the effects of the present invention are exhibited, and completely dissolving it. Either or both of the terminal-modified imide oligomer and the thermoplastic aromatic polyimide may be dissolved in the state in which amide acid groups, which are precursors, are included. The varnish may also be produced by pouring the reaction solution including the terminal-modified imide oligomer into water or the like to isolate a powder product, and then dissolving it in a solvent together with the thermoplastic aromatic polyimide in any ratio.

The powdery imide resin composition of the present invention can be obtained, for example, by pouring varnish in which the terminal-modified imide oligomer and the thermoplastic aromatic polyimide are dissolved into a poor solvent such as water to recrystallize them, and isolating them. It is desirable that the both components are uniformly mixed in the obtained powdery imide resin composition. The obtained powdery imide resin composition is subjected to thermal curing at 280 to 500° C. for about 10 minutes to 40 hours in a state in which the composition is melted at a temperature of 200 to 280° C., whereby an imide resin having the terminal-modified imide oligomer, in the composition, whose molecular weight is made larger can be produced. The imide resin has preferably a Tg of 250° C. or higher and a tensile elongation at break of 10% or more. These properties are measured according to methods described below.

The imide resin composition molded article having the film shape of the present invention (hereinafter may sometimes be referred to as a "filmy imide resin composition") is produced by coating a support with varnish in which the terminal-modified imide oligomer and the thermoplastic aromatic polyimide are dissolved, and removing a solvent at a temperature, for example, of 200 to 280° C. The filmy imide resin composition can also obtained by putting the powdery imide resin composition of the present invention between two supports, heating and pressurizing the laminate, and separating the two supports after the laminate is cooled. The support used here is not particularly limited, and films having a surface, which is coated with the varnish or on which the powder is put, having excellent surface smoothness and high heat resistance and pressure resistance are preferable. It is desirable that the obtained filmy imide resin composition can maintained independently the film shape after it is separated from the support. The film has a film thickness of preferably 1 to 1000 µm, more preferably, 5 to 500 µm, and even more preferably, 5 to 300 µm. The filmy imide resin composition has preferably a breaking elongation in a tensile test of 8% or more. In order to exhibit the excellent melt flowability and moldability of the filmy imide resin composition, it is desirable that the terminal-modified imide oligomer is uniformly dispersed in the filmy imide resin composition, and the reaction of making the molecular weight larger does not occur in the thermally reactive substituents at both ends.

When the filmy imide resin composition is heated at 280 to 500° C. for about 10 minutes to 40 hours, an imide resin composition molded article in which a molecular weight is made larger in a part or all of the terminal-modified imide oligomer component can be produced.

The imide resin composition molded article in which the molecular weight of the terminal-modified imide oligomer is made larger may be produced in one step by heating the varnish coated on the support at 280 to 500° C. for about 10 minutes to 40 hours.

The imide resin composition molded article of the present invention is preferably colored and transparent. The imide resin composition molded article of the present invention has preferably a Tg of 250° C. or higher, and has preferably a tensile elongation at break of 10% or more. These properties are measured according to methods described below.

The imide prepreg, applied in the present invention, is produced by infiltrating, for example, fibers planely arranged in one orientation or a fiber fabric with the varnish, and drying it in a dryer having a temperature of 20 to 180° C. for one minute to 20 hours to remove a part or all of the solvent. The imide prepreg desirably includes the imide resin composition in a content of preferably 10 to 90% by weight, more preferably, 20 to 80% by weight, and even more preferably, 30 to 50% by weight.

The fiber-reinforced composite material of the present invention can be produced by stacking a pre-determined number of the imide prepregs, and heating the resulting product at a temperature of 280 to 500° C. under a pressure of 1 to 1000 kg/cm$^2$ for about 10 minutes to 40 hours using an autoclave or a hot-press.

The fiber-reinforced composite material of the present invention obtained as above (fiber-reinforced laminated plate) has preferably a Tg of 250° C. or higher. The property is measured according to a method described below.

The fiber applying to the present invention may include, for example, inorganic fibers such as a carbon fiber, glass fiber, metal fiber, and ceramic fiber, organic synthetic fibers such as a polyamide fiber, polyester fiber, polyolefin fiber, and novoloid fiber, and the like. The fiber may be used alone or as a mixture of two or more kinds. In order to exhibit the particularly excellent mechanical characteristics, the carbon fiber is desirable. The carbon fiber is not particularly limited so long as the material has a carbon content of 85 to 100% by weight and has a continuous fiber state at least partially including a graphite structure, and may include, for example, a polyacrylonitrile (PAN) fiber, a rayon fiber, a lignin fiber, a pitch fiber, and the like. Among them, the PAN carbon fiber and the pitch carbon fiber are preferable, because they are generic and inexpensive, and have the high strength. In general, the carbon fiber has been subjected to a sizing treatment, and it may be used as it is, or, if necessary, the sizing agent can be removed with an organic solvent, or the like. It is also preferable that opening of fiber bundles is previously performed using air or a roller, and the resin or the resin solution is put between single yarns of the carbon fiber.

The structure of the fiber material forming the imide prepreg or the fiber-reinforced composite material is not particularly limited, and may include continuous fiber structures in one direction, in a woven state (a plain fabric, a satin woven fabric, and the like), or in a knitted state, which may be appropriately selected depending on the purpose. The structure may be used alone or as a mixture.

The fiber-reinforced composite material structure can be obtained by putting the filmy imide resin composition molded article or the imide prepreg between fiber-reinforced composite materials or between a fiber-reinforced composite material and a different material, and heat-melting them to integrate them. Here, the different material is not particularly limited, and any material usually used in this field may be used, and may include, for example, honeycomb-shaped metal materials, spongy cores, and the like.

EXAMPLES

In order to explain the present invention, some Examples will be shown below, but the present invention is not limited thereto. A measurement condition of each characteristic is as follows:

<Test Method>

(1) Measurement of 5% Weight Loss Temperature

A thermogravimetric analyzer (TGA, model: SDT-2960, manufactured by TA Instruments) was used for measurement under a nitrogen stream at a temperature increase rate of 5° C./minute.

(2) Measurement of Glass Transition Temperature (Tg)

A differential scanning calorimeter (DSC, model: DSC-2010, manufactured by TA Instruments) was used for measurement under a nitrogen stream at a temperature increase rate of 5° C./minute. For film-shaped products, a dynamic viscoelasticity analyzer (DMA, model: RSA-II, manufactured by Rheometric) was used for measurement at a temperature increase rate of 10° C./minute at a frequency of 1 Hz. The intersection of two tangent lines before and after the drop of a storage elastic modulus curve was regarded as the glass transition temperature. For fiber-reinforced composite materials, a dynamic viscoelasticity analyzer (DMA, model: DMA-Q-800, manufactured by TA Instruments) was used for measurement in a cantilever manner at a strain of 0.1% at a frequency of 1 Hz under a nitrogen stream at a temperature increase rate of 3° C./minute. The intersection of two tangent lines before and after the drop of a storage elastic modulus curve was regarded as the glass transition temperature.

(3) Measurement of Minimum Melt Viscosity

A rheometer (model: AR2000, manufactured by TA Instruments) was used for measurement with a 25-mm parallel plate at a temperature increase rate of 4° C./minute.

(4) Elastic Modulus Measurement, Breaking Strength Measurement, and Breaking Elongation Measurement A tensilon versatile testing machine (trade name: TENSILON/IUTM-II-20, manufactured by ORIENTEC Co., Ltd.) was used for measurement at room temperature at a tensile speed of 3 mm/minute. The test pieces was film-shaped, having a length of 20 mm, a width of 3 mm, and a thickness of 80 to 120 μm.

(5) Intrinsic Viscosity Measurement

An Ubbelohde viscometer was used for measurement. For solutions having various resin concentrations in NMP, times taking to move between upper and lower benchmarks at 30° C. were measured, and a reduction viscosity at each concentration was calculated from the measured result and a dropping time of the solvent alone. Values obtained by dividing the reduction viscosity by the corresponding resin concentration for various resin solution concentration were plotted on a graph, and a value calculated from an intercept on an extrapolation of an approximation straight line created by a least-squares method was regarded as the intrinsic viscosity.

(6) Stereoscopic Microscope Observation

A Stereoscopic microscope (SZ-PT manufactured by Olympus Corporation) was used for observation of the film surface and the inside thereof at room temperature at a magnification of 18 to 110.

(7) Measurement of Infrared Absorption Spectrum

An FT/IR-230S spectrometer manufactured by JASCO Corporation was used for infrared absorption spectrum measurement at room temperature in a measurement range of 400 cm$^{-1}$ to 4,000 cm$^{-1}$ at an accumulation number of 32.

Example 1

To a 2,000-mL three-necked separable flask equipped with a thermometer, a stirrer, and a nitrogen inlet tube were added 248.52 g (0.90 mol) of 2-phenyl-4,4'-diaminodiphenyl ether, 34.84 g (0.10 mol) of 9,9-bis(4-aminophenyl) fluorene, and 700 mL of N-methyl-2-pyrrolidone, and they were dissolved. After that, 174.50 g (0.8 mol) of 1,2,4,5-benzene tetracarboxylic dianhydride and 300 mL of N-methyl-2-pyrrolidone were added thereto, and under a nitrogen stream, the mixture was subjected to a polymerization reaction at room temperature for 2.5 hours, subsequently at 60° C. for 1.5 hours, and then at room temperature for one hour to produce an amide acid oligomer. To the reaction solution was added 99.29 g (0.4 mol) of 4-(2-phenylethynyl)phthalic anhydride, and the reaction was performed at room temperature for 12 hours under a nitrogen stream to terminal-modify, and subsequently the mixture was stirred at 195° C. for 5 hours, thereby forming imide bonds.

After the reaction liquid was cooled, a part thereof was poured into 900 mL of deionized water, and a precipitated powder was filtered. The powder was washed with 80 mL of methanol for 30 minutes, and the powder obtained by the filtration was dried at 150° C. under a reduced pressure for one day to obtain a product. The obtained terminal-modified imide oligomer is represented by General Formula (3) described below, wherein $R_1$ and $R_2$ are a hydrogen atom or a phenyl group, and either one is the phenyl group; $R_3$ is 2-phenyl-4,4'-diaminodiphenyl ether residue or 9,9-bis(4-aminopheny)fluorene residue; $R_4$ is 9,9-bis(4-aminophenyl) fluorene residue; and m=3.6 and n=0.4 on average.

[C. 11]

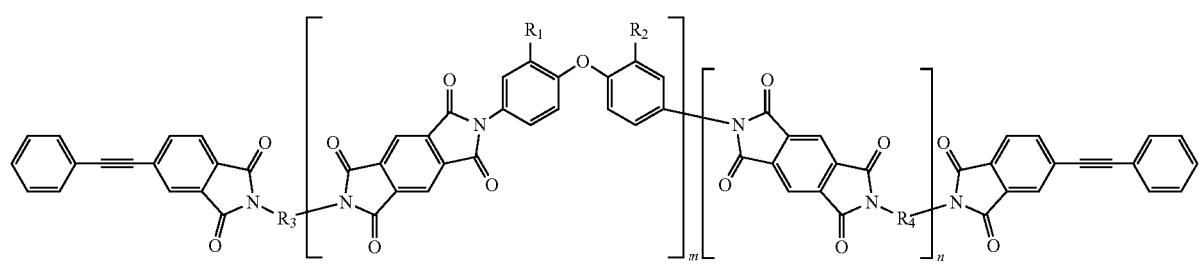

(3)

An uncured powder of the thus obtained terminal-modified imide oligomer was soluble in an NMP solvent in a percent of 30% or more at room temperature, and the gelation or precipitation of the NMP solution including the powder was not observed after a several-month storage. The terminal-modified imide oligomer before curing had a Tg of 221° C., resulting from DSC measurement, and had a minimum melt viscosity of 1280 Pa·s (340° C.). The powder of the terminal-modified imide oligomer was heated at 370° C. for one hour using a hot press, and the obtained filmy cured product (thickness: 111 μm) had a Tg, obtained from DSC measurement, of 371° C., and a 5% weight loss temperature of 538° C. For the mechanical characteristics in the tensile test (dynamic properties) of the film-shaped cured product, the elastic modulus was 2.97 GPa, the breaking strength was 119 MPa, and the breaking elongation was 13%.

Example 2

The terminal-modified imide oligomer powder (5.0 g) obtained in Example 1 and 5.0 g of a thermoplastic aromatic polyimide powder (development article name: YS-20A, manufactured by Shanghai Research Institute of Synthetic Resin) were stirred in 40 g of NMIP to completely dissolve them, thereby preparing varnish (the content of the total imide resins in the varnish was 20% by weight).

The thermoplastic aromatic polyimide (YS-20A) had a composition including a combination of 3,4'-oxydiphthalic anhydride and 4,4'-oxydianiline, and had a Tg, obtained from DSC, of 270° C., a 5% weight loss of 529° C., and an intrinsic viscosity of 0.47 dL/g. The polyimide was represented by General Formula (5) wherein $R_1$ and $R_2$ were 4,4'-oxydianiline residue; $R_3$ was 3,4'-oxydiphthalic anhydride residue; and m and n satisfied the relationships of m≥1 and n=0.

[C. 12]

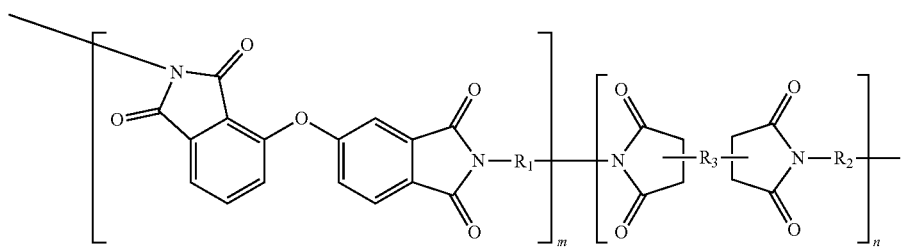

(5)

Example 3

A part of the varnish, produced in Example 2, was re-precipitated in water, and then was recovered by suction filtration. After the precipitate was washed with water and methanol, it was dried in a vacuum oven at 240° C. for 3 hours to obtain a powdery imide resin composition. According to DSC measurement of the obtained powder imide resin composition, the Tg thereof was observed at 253° C. alone, and the exothermic peak was observed at around 430° C. The minimum melt viscosity was 2800 Pa·s (360° C.).

Example 4

A part of the powdery imide resin composition, obtained in Example 3, was put between two polyimide films having an excellent surface smoothness (trade name: UPILEX-75S, thickness: 75 m, size: 15 cm square, manufactured by Ube Industries Ltd.), which was pressurized at 370° C. for one hour, cooled, and then separated to obtain a reddish brown, transparent, filmy imide resin composition. IR spectrum measurement using a part of the filmy imide resin composition showed the disappearance of the absorption around 2.210 $cm^{-1}$ assigned to the stretching vibration of the triple bond in the PEPA as the terminal group of the terminal-modified imide oligomer, and this indicated that the pressurized thermoforming allowed the terminal-modified imide oligomer component in the filmy imide resin composition to undergo thermal addition reaction to make the molecular weight larger. The Tg was observed at 296° C. alone and the exothermic peak was observed at around 430° C. by DSC measurement. The Tg was observed at 294° C. alone by DMA measurement. The 5% weight loss temperature was observed at 517° C., and the breaking elongation, obtained from the tensile test, was 12%. The results of the microscope observation showed that no phase structure mainly including the terminal-modified imide oligomer or the thermoplastic aromatic polyimide was observed on the film surface or inside thereof, and thus the both components were uniformly mixed.

Example 5

A part of the varnish, produced in Example 2, was flow casted and coated on a flat-plate glass support using a coater, which was dried in an air circulation type oven at 250° C. for 30 minutes. After that, the formed film was separated from the glass support to obtain a soft, light yellow, transparent filmy imide resin composition having a sufficient self-supporting property. The filmy imide resin composition had a film thickness of about 50 μm, and its Tg was observed at 253° C. alone by DSC measurement. The results of the microscope observation showed that no phase structure mainly including the terminal-modified imide oligomer or the thermoplastic aromatic polyimide was observed on the film surface or inside thereof, and thus the both components were uniformly mixed.

Example 6

The filmy imide resin composition, produced in Example 5, was put between two polyimide films having an excellent surface smoothness (trade name: UPILEX-75S, manufactured by Ube Industries Ltd.), which was pressurized at 370° C. for one hour, cooled, and then separated to obtain a soft, light yellow, transparent, filmy imide resin composition having a sufficient self-supporting property. IR spectrum measurement using a part of the filmy imide resin composition showed the disappearance of the absorption around 2,210 $cm^{-1}$ assigned to the stretching vibration of the triple bond in the PEPA as the terminal group of the terminal-modified imide oligomer, and this indicated that the pressurized thermoforming allowed the terminal-modified imide oligomer component in the filmy imide resin composition to undergo thermal addition reaction to make the molecular weight larger. The Tg was observed at 296° C. alone by DSC measurement, and the Tg was observed at 294° C. alone by DMA measurement. The 5% weight loss temperature was observed at 517° C., and the breaking elongation, obtained from the tensile test, was 8.5%. The results of the microscope observation showed that no phase structure mainly including the terminal-modified imide oligomer or the thermoplastic aromatic polyimide was observed on the film surface or inside thereof, and thus the both components were uniformly mixed.

Example 7

A part of the varnish, produced in Example 2, was flow casted and coated on a polyimide film (UPILEX-75S) using a coater, which was dried in an air circulation type oven at 250° C. for 30 minutes, followed by heating it at 370° C. for one hour in vacuo. After that, the resulting product was separated from the polyimide film (UPILEX-75S) to obtain a soft, reddish brown, transparent, filmy imide resin composition having a sufficient self-supporting property. IR spectrum measurement using a part of the filmy imide resin composition showed the disappearance of the absorption around 2,210 $cm^{-1}$ assigned to the stretching vibration of the triple bond in the PEPA as the terminal group of the terminal-modified imide oligomer, and this indicated that the pressurized thermoforming allowed the terminal-modified imide oligomer component in the filmy imide resin composition to undergo thermal addition reaction to make the molecular weight larger. The Tg was observed at 296° C. alone by DSC measurement, and the Tg was observed at 294° C. alone by DMA measurement. The 5% weight loss temperature was observed at 517° C. and the breaking elongation, obtained from the tensile test, was 8.7%. The results of the microscope observation showed that no phase structure mainly including the terminal-modified imide oligomer or the thermoplastic aromatic polyimide was observed on the film surface or inside thereof, and thus the both components were uniformly mixed.

Example 8

A part of 400 g of the varnish of the imide resin composition, produced in the same manner as in Example 2, was infiltrated into plain-weave fabrics with dimensions of 30 cm×30 cm ("trade name: Besfight IM-600 6K", fiber basis weight: 195 $g/m^2$, density: 1.80 $g/cm^3$, manufactured by Toho Tenax Co., Ltd.) that had been previously desized with acetone. The resulting product was dried in a dryer at 100° C. for 10 minutes to obtain imide prepregs. The obtained imide prepregs had a resin content of 38% by weight and a solvent content of 17% by weight.

Example 9

On a stainless steel plate having dimensions of 30 cm×30 cm was placed a polyimide film as a release film, on which 12 imide prepregs, produced in Example 8, were stacked. A polyimide film and a stainless steel plate were further stacked, which was heated on a hot press at a temperature increase rate of about 5° C./minute up to 260° C. in vacuo. After the resulting product was heated at 260° C. for 2 hours, it was heated at a temperature increase rate of about 3° C./minute up to 370° C. and at a pressure of 1.3 MPa, and the heating was continued at 370° C. for one hour under pressure. From the appearance or ultrasonic testing and cross-section observation, it was evaluated that a good laminate containing no big voids was obtained (a polyimide-carbon composite material). In the obtained laminate, the glass transition temperature was observed at 296° C., and the fiber volume fraction (V) was 0.6, and the resin content of 35% by weight.

Example 10

The filmy imide resin composition, produced in Example 6, was put between the two polyimide-carbon composite materials, produced in Example 9, which was heated under pressure at 280° C. for 30 minutes in a condition of a pressure of 1 MPa using a press machine, and it was heated under pressure at 370° C. for one hour to obtain a composite material structure in which the two polyimide-carbon composite materials were strongly integrated to each other.

Example 11

A part of 400 g of the varnish of the imide resin composition, produced in the same manner as in Example 2, was diluted, and was infiltrated into plain-weave fabrics with dimensions of 30 cm×30 cm ("trade name: Besfight IM-600 6K", fiber basis weight: 195 $g/m^2$, density: 1.80 g/cm', manufactured by Toho Tenax Co., Ltd.) that had been previously desized with acetone. The resulting product was dried in a dryer at 250° C. for 30 minutes to obtain imide dry prepregs. The obtained prepregs had a resin content of 35% by weight.

Example 12

On a stainless steel plate having dimensions of 30 cm×30 cm was placed a polyimide film as a release film, on which 12 imide prepregs, produced in Example 8, were stacked. A polyimide film and a stainless steel plate were further stacked, which was heated on a hot press at a temperature increase rate of about 5° C./minute up to 260° C. in vacuo. After the resulting product was heated at 260° C. for 2 hours, it was heated at a temperature increase rate of about 3° C./minute up to 370° C. and at a pressure of 1.3 MPa, and the heating was continued at 370° C. for one hour under pressure. From the appearance or ultrasonic testing and cross-section observation, it was evaluated that a good laminate containing no big voids was obtained (dry prepregs). In the obtained laminate, the glass transition temperature was observed at 296° C., and the fiber volume fraction (Vf) was 0.6, and the resin content of 33% by weight.

Example 13

The dry prepregs, produced in Example 12, were put between the two polyimide-carbon composite materials, produced in Example 9, which was heated under pressure at 280° C. for 30 minutes in a condition of a pressure of 1 MPa using a press machine, and it was heated under pressure at 370° C. for one hour to obtain a composite material structure in which the two polyimide-carbon composite materials were strongly integrated to each other.

Example 14

In 40 g of NMP were stirred 2.0 g of the terminal-modified imide oligomer powder, obtained in Example 1, and 8.0 g of the thermoplastic aromatic polyimide powder (YS-20A, the Tg according to DSC: 270° C., the 5% weight loss: 529° C., the intrinsic viscosity: 0.47 dL/g) to obtain varnish in which the two components were completely dissolved (the total imide resin was 20% by weight in the varnish).

Example 15

A part of the varnish, produced in Example 2, was re-precipitated in water, and then was recovered by suction filtration. After the precipitate was washed with water and methanol, it was dried in a vacuum oven at 240° C. for 3 hours to obtain a powdery imide resin composition. The Tg thereof was observed at 240° C. alone, and the exothermic peak was observed at around 430° C. by DSC measurement.

Example 16

A part of the powdery imide resin composition, obtained in Example 15, was put between two polyimide films having an excellent surface smoothness (trade name: UPILEX-75S, thickness: 75 m, size: 15 cm square, manufactured by Ube Industries Ltd.), which was pressurized at 370° C. for one hour, cooled, and then separated to obtain a soft, reddish brown, transparent, filmy imide resin composition having a sufficient self-supporting property. IR spectrum measurement using a part of the filmy imide resin composition showed the disappearance of the absorption around 2,210 cm$^{-1}$ assigned to the stretching vibration of the triple bond in the PEPA as the terminal group of the terminal-modified imide oligomer, and this indicated that the pressurized thermoforming allowed the terminal-modified imide oligomer component in the filmy imide resin composition to undergo thermal addition reaction to make the molecular weight larger. The Tg was observed at 280° C. alone and the exothermic peak was observed at around 430° C. by DSC measurement. The Tg was observed at 277° C. alone by DMA measurement. The 5% weight loss temperature was observed at 535° C., and the breaking elongation, obtained from the tensile test, was 11.3%. The results of the microscope observation showed that no phase structure mainly including the terminal-modified imide oligomer or the thermoplastic aromatic polyimide was observed on the film surface or inside thereof, and thus the both components were uniformly mixed.

Example 17

A part of the varnish, produced in Example 14, was flow casted and coated on a flat-plate glass support using a coater, which was dried in an air circulation type oven at 250° C. for 30 minutes. After that, the formed film was separated from the glass support to obtain a soft, light yellow, transparent filmy imide resin composition having a sufficient self-supporting property. The filmy imide resin composition had a film thickness of about 50 µm. The Tg was observed at 240° C. alone and the exothermic peak was observed at around 430° C. by DSC measurement. The Tg was observed at 231° C. alone by DMA measurement. The results of the microscope observation showed that no phase structure mainly including the terminal-modified imide oligomer or the thermoplastic aromatic polyimide was observed on the film surface or inside thereof, and thus the both components were uniformly mixed.

Example 18

The filmy imide resin composition, produced in Example 17, was put between two polyimide films having an excellent surface smoothness (trade name: UPILEX-75S, manufactured by Ube Industries Ltd.), which was pressurized at 370° C. for one hour, cooled, and then separated to obtain a soft, reddish brown, transparent, filmy imide resin composition having a sufficient self-supporting property. IR spectrum measurement using a part of the filmy imide resin composition showed the disappearance of the absorption around 2,210 cm$^{-1}$ assigned to the stretching vibration of the triple bond in the PEPA as the terminal group of the terminal-modified imide oligomer, and this indicated that the pressurized thermoforming allowed the terminal-modified imide oligomer component in the filmy imide resin composition to undergo thermal addition reaction to make the molecular weight larger. The Tg was observed at 280° C. alone by DSC measurement, and the Tg was observed at 277° C. alone by DMA measurement. The 5% weight loss temperature was observed at 535° C., and the breaking elongation, obtained from the tensile test, was 11.5%. The results of the microscope observation showed that no phase structure mainly including the terminal-modified imide oligomer or the thermoplastic aromatic polyimide was observed on the film surface or inside thereof, and thus the both components were uniformly mixed.

Comparative Example 1

To a 100-mL three-necked flask equipped with a thermometer, a stirrer, and a nitrogen inlet tube were added 2.0024 g (10 mmol) of 4,4'-diaminodiphenyl ether and 9.3 mL of N-methyl-2-pyrrolidone, and they were dissolved. After that, 1.7450 g (8 mmol) of 1,2,4,5-benzene tetracarboxylic dianhydride was added thereto, and, under a nitrogen stream, the mixture was subjected to a polymerization reaction at room temperature for 2.5 hours, subsequently at 60° C. for 1.5 hours, and then at room temperature for one hour to produce an amide acid oligomer. To the reaction solution was added 0.9929 g (4 mmol) of 4-(2-phenylethynyl)phthalic anhydride, and the reaction was performed at room temperature for 12 hours under a nitrogen stream to terminal-modify, and subsequently the mixture was stirred at 195° C. for 5 hours, thereby forming imide bonds. During the imidization reaction, precipitation of imide oligomers was observed.

After the reaction liquid was cooled, it was poured into 900 mL of deionized water, and a precipitated powder was filtered. The powder was washed with 80 mL of methanol for 30 minutes, and the powder obtained by the filtration was dried at 130° C. under a reduced pressure for one day to obtain a product.

The obtained terminal-modified imide oligomer is represented by General Formula (6) described below, wherein $R_1$ and $R_2$ are a 4,4'-oxydianiline residue; and m=4 and n=0 on average.

[C. 13]

(6)

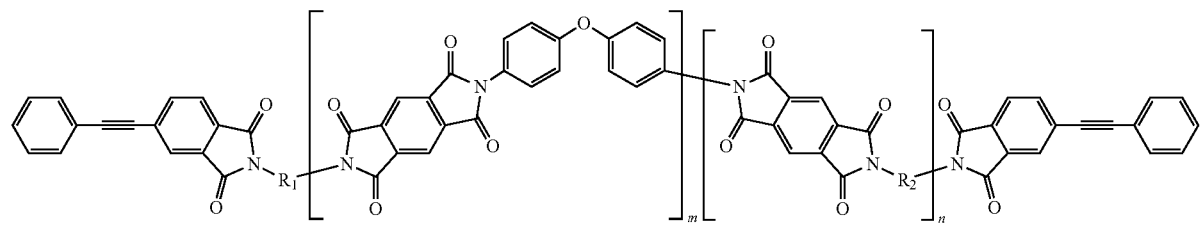

An uncured product of the thus obtained terminal-modified imide oligomer was insoluble in an NMP solvent. The terminal-modified imide oligomer did not show the melt flowability even at 300° C. or higher.

Comparative Example 2

The terminal-modified imide oligomer powder, obtained in Example 1, (5.0 g) and 5.0 g of a thermoplastic aromatic polyimide powder, obtained from Shanghai Research Institute of Synthetic Resin, (development article name: YS-20, which has a composition having a combination of 4,4'-oxydiphthalic anhydride and 4,4'-oxydianiline, the Tg thereof being 250° C. by DSC, the 5% weight loss being 529° C., the intrinsic viscosity being 0.6 dL/g, being represented by General Formula (7) described below wherein $R_1$ and $R_2$ are a 4,4'-oxydianiline residue, $R_3$ is a 4,4'-oxydiphthalic anhydride residue, and m and n satisfy the relationships of m≥1 and n=0) were stirring in 40 g of NMP while they were heated, but they did not completely dissolved.

[C. 14]

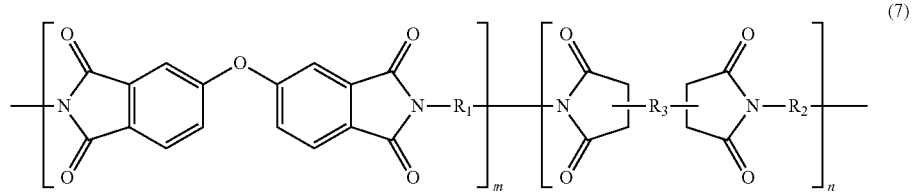

(7)

Example 19

To a 100-mL three-necked flask equipped with a thermometer, a stirrer, and a nitrogen inlet tube were added 4.0048 g (20 mmol) of 4,4'-diaminodiphenyl ether and 70 mL of NMP, and they were dissolved. After that, 6.2044 g (20 mmol) of 4,4'-oxydiphthalic anhydride was added thereto, and under a nitrogen stream, the mixture was subjected to a polymerization reaction at room temperature for 6 hours to produce a solution of polyamide acid oligomer containing no precipitates (weight content of the polyamide acid in the solution: 12.5% by weight).

To 12 g of the polyamide acid solution was added 1.5 g of the terminal-modified imide oligomer powder, produced in Example 2, which was stirred to obtain a solution in which the components were uniformly dissolved (weight contents of the polyamide acid and the terminal-modified imide oligomer in the solution being 11.1% respectively). The solution was flow casted and coated on a flat-plate glass support using a coater, which was dried in an air circulation type oven at 250° C. for 30 minutes. After that, the formed film was separated from the glass support to obtain a soft, light yellow, transparent filmy imide resin composition having a sufficient self-supporting property. The filmy imide resin composition had a film thickness of about 50 µm, and its Tg was observed at 240° C. alone by DSC measurement. The breaking elongation, obtained from the tensile test, was 11.5%. The results of the microscope observation showed that no phase structure mainly including the terminal-modified imide oligomer or the thermoplastic aromatic polyimide was observed on the film surface or inside thereof, and thus the both components were uniformly mixed.

Example 20

The filmy imide resin composition, produced in Example 19, was subjected to a heat-treatment in an oven under vacuum at 300° C. for 30 minutes, subsequently 350° C. for 30 minutes, and then 370° C. for 30 minutes to obtain a soft filmy imide resin composition having a sufficient self-supporting property. IR spectrum measurement using a part of the filmy imide resin composition showed the disappearance of the absorption around 2,210 cm$^{-1}$ assigned to the stretching vibration of the triple bond in the PEPA as the terminal group of the terminal-modified imide oligomer, and this indicated that the heat-treatment allowed the terminal-modified imide oligomer component in the filmy imide resin composition to undergo thermal addition reaction to make the molecular weight larger. The Tg was observed at 310° C. alone by DSC measurement, the Tg was observed at 305° C. alone by DMA measurement, the 5% weight loss temperature was observed at 535° C., and the breaking elongation, obtained from the tensile test, was 10%.

Comparative Example 3

To a 100-mL three-necked flask equipped with a thermometer, a stirrer, and a nitrogen inlet tube were added 2.0024 g (10 mmol) of 4,4'-diaminodiphenyl ether and 16.2 ml of N-methyl-2-pyrrolidone, and they were dissolved. After that, 2.1813 g (10 mmol) of 1,2,4,5-benzene tetracarboxylic dianhydride was added thereto, and under a nitrogen stream, the mixture was subjected to a polymerization reaction at room temperature for 2.5 hours, subsequently at 60° C. for 1.5 hours, and then at room temperature for one hour to produce a solution of polyamide acid oligomer containing no precipitates (weight content of the polyamide acid in the solution: 20.0% by weight).

To 12 g of the polyamide acid solution was added 2.4 g of the terminal-modified imide oligomer powder, produced in Example 2, which was stirred to obtain a solution in which the components were uniformly dissolved (weight contents of the polyamide acid and the terminal-modified imide oligomer in the solution being 16.7% respectively). The solution was flow casted and coated on a flat-plate glass support using a coater, which was dried in an air circulation type oven at 250° C. for 30 minutes. After that, the formed film was separated from the glass support to obtain a very brittle, opaque imide resin composition having an insufficient self-supporting property. The imide resin composition was heated to 300° C. or higher, but it was not dissolved, and thus it was difficult to form a film.

INDUSTRIAL APPLICABILITY

The present invention relates to a polyimide powder, varnish, a film, a molded article, a prepreg, and a fiber-reinforced composite material thereof, which have excellent heat resistance; and particularly to a material usable in a wide range of fields including aircraft and apparatuses for the aerospace industry, which require easy moldability and high heat resistance.

The invention claimed is:
1. An imide resin composition comprising a terminal-modified imide oligomer represented by Formula (1) described below, and a thermoplastic aromatic polyimide having an oxybisphthalimide skeleton, represented by Formula (5) described below:

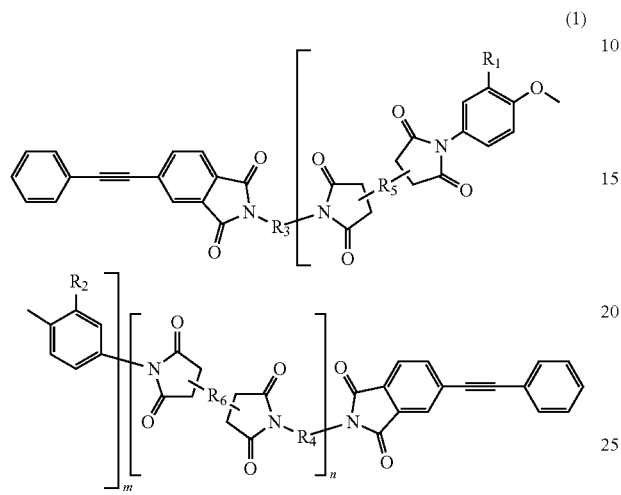

(1)

wherein one of $R_1$ and $R_2$ is a hydrogen atom, and the other of $R_1$ and $R_2$ is a phenyl group; $R_3$ and $R_4$ are the same or different, and each is a divalent residue of an aromatic diamine selected from the group consisting of 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenyl ether (4,4'-ODA), 3,4'-diaminodiphenyl ether (3,4'-ODA), 3,3'-diaminodipbenyl ether, 3,3'-diaminobenzophenone, 4,4'-diaminobenzophenone, 3,3'-diaminodiphenyl methane, 4,4'-diaminodiphenyl methane, bis(2,6-diethyl-4-aminophenyl)methane, 4,4'-methylene-bis(2,6-diethyl aniline), bis(2-ethyl-6-methyl-4-aminophenyl) methane, 4,4'-methylene-bis(2-ethyl-6-methylaniline), 2,2-bis(3-aminophenyl)propane, 2,2-bis(4-aminophenyl)propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl]hexafluoropropane, 9,9-bis(4-aminophenyl)fluorene, 9,9-bis(4-(4-aminophenoxy)phenyl)fluorene and mixtures thereof; $R_5$ and $R_6$ are the same or different, and each is a tetravalent aromatic tetracarboxylic acid residue; m and n satisfy relationships of $m \geq 1$, $n \geq 0$, $1 \leq m+n \leq 20$, and $0.05 \leq m/(m+n) \leq 1$; and the arrangement of repeating units in Formula (1) is either a block or random;

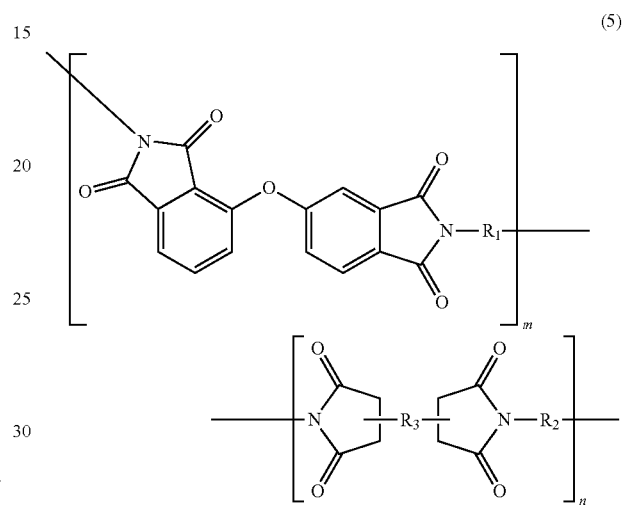

(5)

wherein $R_1$ and $R_2$ are the same or different, and each is a divalent aromatic diamine residue; $R_3$ is at least one tetravalent aromatic tetracarboxylic acid residue selected from the group consisting of 3,3'-oxydiphthalic anhydride residue and 4,4'-oxydiphthalic anhydride residue; m and n satisfy relationships of $m \geq 1$ and $n \geq 0$, and the arrangement of repeating units in Formula (5) is either a block or random.

2. The imide resin composition according to claim 1, wherein the tetravalent aromatic tetracarboxylic acid residue, represented by $R_5$ or $R_6$, is a tetravalent residue of 1,2,4,5-benzene tetracarboxylic acid, and the terminal-modified imide oligomer is a compound represented by Formula (3) described below:

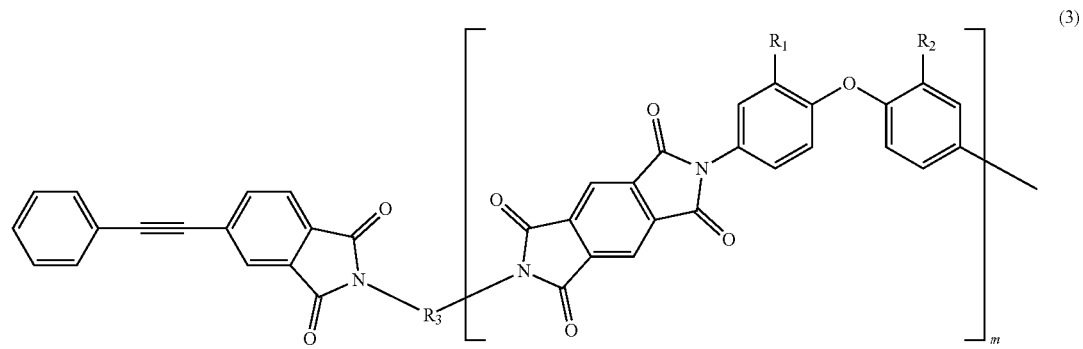

(3)

-continued

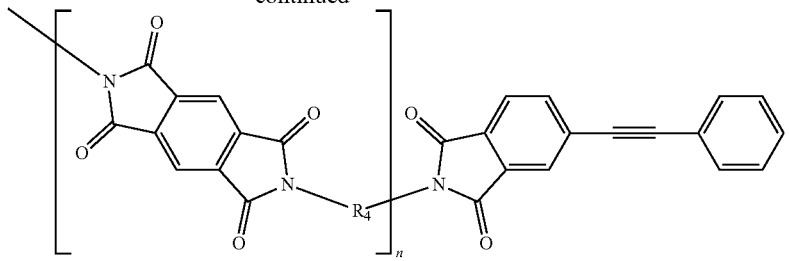

wherein one of $R_1$ and $R_2$ is a hydrogen atom, and the other of $R_1$ and $R_2$ is a phenyl group; $R_3$ and $R_4$ are the same or different, and each is a divalent residue of an aromatic diamine selected from the group consisting of 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenyl ether (4,4'-ODA), 3,4'-diaminodiphenyl ether (3,4'-ODA), 3,3'-diaminodipbenyl ether, 3,3'-diaminobenzophenone, 4,4'-diaminobenzophenone, 3,3'-diaminodiphenyl methane, 4,4'-diaminodiphenyl methane, bis(2,6-diethyl-4-aminophenyl)methane, 4,4'-methylene-bis(2,6-diethyl aniline), bis(2-ethyl-6-methyl-4-aminophenyl)methane, 4,4'-methylene-bis(2-ethyl-6-methylaniline), 2,2-bis(3-aminophenyl)propane, 2,2-bis(4-aminophenyl)propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl]hexafluoropropane, 9,9-bis(4-aminophenyl)fluorene, 9,9-bis(4-(4-aminophenoxy)phenyl)fluorene and mixtures thereof; m and n satisfy relationships of $m \geq 1$, $n \geq 0$, $1 \leq m+n \leq 20$, and $0.05 \leq m/(m+n) \leq 1$; and the arrangement of repeating units in Formula (3) is either a block or random.

3. The imide resin composition according to claim 1, wherein the tetravalent aromatic tetracarboxylic acid residue, represented by $R_5$ or $R_6$, is a tetravalent residue of 3,3',4,4'-biphenyl tetracarboxylic acid, and the terminal-modified imide oligomer is a compound represented by Formula (4) described below:

ene-2,6-diamine, 4,4'-diaminodiphenyl ether (4,4'-ODA), 3,4'-diaminodiphenyl ether (3,4'-ODA), 3,3'-diaminodipbenyl ether, 3,3'-diaminobenzophenone, 4,4'-diaminobenzophenone, 3,3'-diaminodiphenyl methane, 4,4'-diaminodiphenyl methane, bis(2,6-diethyl-4-aminophenyl)methane, 4,4'-methylene-bis(2,6-diethyl aniline), bis(2-ethyl-6-methyl-4-aminophenyl)methane, 4,4'-methylene-bis(2-ethyl-6-methylaniline), 2,2-bis(3-aminophenyl)propane, 2,2-bis(4-aminophenyl)propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl]hexafluoropropane, 9,9-bis(4-aminophenyl)fluorene, 9,9-bis(4-(4-aminophenoxy)phenyl)fluorene and mixtures thereof; m and n satisfy relationships of $m \geq 1$, $n \geq 0$, $1 \leq m+n \leq 20$, and $0.05 \leq m/(m+n) \leq 1$; and the arrangement of repeating units in Formula (4) is either a block or random.

4. The imide resin composition according to claim 1, wherein in the terminal-modified imide oligomer represented by Formula (1), a part of m groups $R_5$ and n groups $R_6$ is a tetravalent residue of 1,2,4,5-benzene tetracarboxylic acid and the rest thereof is a tetravalent residue of 3,3',4,4'-biphenyl tetracarboxylic acid.

5. A varnish comprising the imide resin composition according to claim 1 dissolved in an organic solvent.

6. A powdery imide resin composition obtained by removing an organic solvent from the varnish according to claim 5.

7. An imide resin composition molded article obtained by heating the powdery imide resin composition according to claim 6 in a melted state, thereby making a molecular weight of the terminal-modified imide oligomer component larger.

8. A film-shaped imide resin composition molded article obtained by coating a support with the varnish according to claim 5, and removing an organic solvent from the varnish.

9. An imide resin composition molded article obtained by heating the film-shaped imide resin composition molded (4)

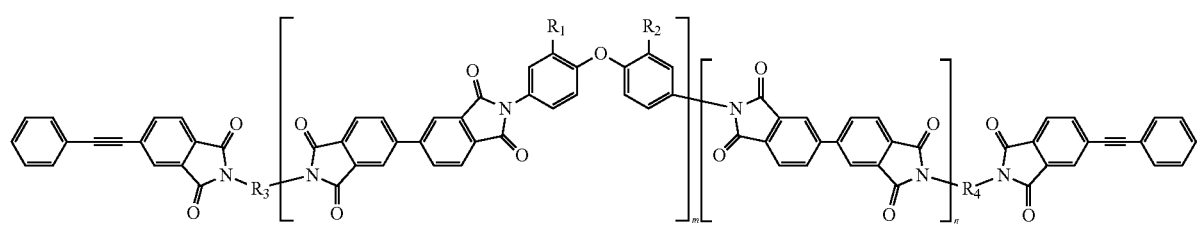

article according to claim 8 in a melted state, thereby making a molecular weight of the terminal-modified imide oligomer component larger.

10. The imide resin composition molded article according to claim 8, which is colored and transparent.

11. The imide resin composition molded article according to claim 8, which has a glass transition temperature (Tg) of 250° C. or higher.

12. The imide resin composition molded article according to claim 8, which has a tensile elongation at break of 10% or more.

13. An imide resin composition molded article obtained by thermally curing the varnish according to claim 5.

\* \* \* \* \*